United States Patent [19]

Mizuno et al.

[11] Patent Number: 5,116,906
[45] Date of Patent: May 26, 1992

[54] THERMOPLASTIC RESIN COMPOSITION

[75] Inventors: Yukio Mizuno, Ehime; Takashi Maruyama, Ibaraki, both of Japan

[73] Assignee: Sumitomo Chemical Co., Ltd., Osaka, Japan

[21] Appl. No.: 476,740

[22] Filed: Feb. 8, 1990

[30] Foreign Application Priority Data

Feb. 9, 1989 [JP] Japan ................... 1-31492

[51] Int. Cl.⁵ .............. C08L 67/00; C08L 69/00; C08L 71/12; C08L 79/00
[52] U.S. Cl. ........................ 525/68; 525/66; 525/67; 525/92; 525/146; 525/152; 525/394; 525/905
[58] Field of Search .............. 525/394, 66, 67, 68, 525/905

[56] References Cited

U.S. PATENT DOCUMENTS

| | | |
|---|---|---|
| 4,315,086 | 2/1982 | Ueno et al. |
| 4,642,358 | 2/1987 | Aycock et al. |
| 4,957,967 | 9/1990 | Mizuno et al. ............ 525/68 |

FOREIGN PATENT DOCUMENTS

| | | |
|---|---|---|
| 0349339 | 1/1990 | European Pat. Off. |
| 0351140 | 1/1990 | European Pat. Off. |
| 2853884 | 7/1979 | Fed. Rep. of Germany |
| 4215782 | 8/1942 | Japan |
| 4317812 | 7/1943 | Japan |
| 49-98858 | 9/1974 | Japan |
| 51-21664 | 7/1976 | Japan |
| 60-221459 | 11/1985 | Japan |
| 62-260855 | 11/1987 | Japan |
| 62-263251 | 11/1987 | Japan |
| 8700850 | 2/1987 | World Int. Prop. O. |

OTHER PUBLICATIONS

U.S. Pat. No. 4,957,967 (Official Gazette).
U.S. Pat. No. 4,209,427 (Official Gazette).

Primary Examiner—Jacob Ziegler
Attorney, Agent, or Firm—Cushman, Darby & Cushman

[57] ABSTRACT

Disclosed is a thermoplastic resin composition which is improved in compatibility between polyphenylene ether and thermoplastic polyester and is excellent in processability, solvent resistance, and impact strength.

This composition comprises:
100 parts by weight of a composition comprising (A) 5-95% by weight of a polyphenylene ether and (B) 95-5% by weight of a thermoplastic polyester,
(C) 0.5-100 parts by weight of an aromatic polycarbonate resin,
(D) 0-50 parts by weight of a rubber-like polymer, and
(E) 0.01-10 parts by weight of an amino resin obtained by modifying with an alcohol an addition reaction product of formaldehyde and at least one compound selected from the group consisting of melamine, guanamine and urea.

5 Claims, No Drawings

THERMOPLASTIC RESIN COMPOSITION

The present invention relates to a resin composition which comprises a polyphenylene ether and a thermoplastic polyester.

More particularly, it relates to a novel thermoplastic resin composition which comprises a resin composition comprising a polyphenylene ether and a thermoplastic polyester, to which are added an aromatic polycarbonate resin and an amino resin, and, if necessary, a rubber-like polymer. This resin composition is excellent in solvent resistance, flowability, mechanical properties and processability.

The composition of the present invention can be made into shaped articles, sheets, or films by injection molding, extrusion molding, etc.

Polyphenylene ether is superior in mechanical properties, heat resistance, electrical properties, and besides in dimensional stability and is noticed as a resin suitable for a wide range of uses, but it has severe defects that it is inferior in processability, impact strength and solvent resistance, for example, resistance to chemicals such as gasoline.

In order to improve processability and impact strength, Japanese Patent Kokoku No. 43-17812 and Japanese Patent Kokai No. 49-98858 have proposed blends of polyphenylene ether with polystyrene or polystyrene reinforced with rubber. However, such resin compositions are also inferior in solvent resistance.

The resin composition comprising rubber-reinforced polystyrene/polyphenylene ether has excellent impact strength and processability and so is much produced in industrial scale, but undergoes limitation in its use due to its inferior solvent resistance.

Further, Japanese Patent Kokoku No. 42-15782 has proposed to add aromatic polycarbonate to polyphenylene ether. Although the resin composition comprising aromatic polycarbonate/polyphenylene ether can be improved to some extent in processability without severe damage of heat resistance of polyphenylene ether, this improvement is not sufficient due to relatively high melt viscosity of aromatic polycarbonate and besides, solvent resistance is hardly improved.

Further, Japanese Patent Kokoku No. 51-21664 has proposed to add polyester to polyphenylene ether for improvement of processability and solvent resistance of polyphenylene ether. However, polyphenylene ether and polyester are very poor in compatibility and the resulting resin composition is inferior in mechanical properties especially when content of polyester exceeds 20%, and molded articles obtained therefrom by injection molding show delamination phenomenon and good molded articles cannot be obtained.

As methods to improve these defects, Japanese Patent Kokai No. 60-221459 has proposed to add a copolymer of a monomer of unsaturated compound having epoxy group and styrene, Japanese Patent Kokai No. 62-260855 has proposed to add maleic anhydride, Japanese Patent Kokai No. 62-263251 has proposed to add a copolymer of styrene and unsaturated carboxylic acid, and Japanese Patent Kohyo No. 63-500387 has proposed to add at least one polymer containing aromatic polycarbonate unit or a blend of this polymer with styrene homopolymer. However, these methods are still unsatisfactory.

The inventors have already found a resin composition excellent in mechanical properties and solvent resistance and good in processability and well balanced in properties which comprises polyphenylene ether, thermoplastic polyester resin and amino resin, and have filed a patent application thereon (Japanese Patent Application No. 63-165376). However, this resin composition is still unsatisfactory in mechanical properties in practical use.

The principal object of the present invention is to provide a practically usable resin composition which is improved in compatibility between polyphenylene ether and thermoplastic polyester and which is excellent in solvent resistance as well as heat resistance and impact strength.

As a result of intensive research conducted by the inventors in an attempt to develop a technique effective to improve a resin composition comprising polyphenylene ether and a thermoplastic polyester, it has been found that a thermoplastic resin composition excellent in solvent resistance, mechanical properties, heat resistance and processability can be obtained by adding an aromatic polycarbonate, an amino resin and, if necessary, a rubber-like polymer to a resin composition comprising polyphenylene ether and a thermoplastic polyester.

That is, the present invention relates to a thermoplastic resin composition which comprises:

100 parts by weight of a composition comprising (A) 5–95% by weight of polyphenylene ether and (B) 95–5% by weight of a thermoplastic polyester, (C) 0.5–100 parts by weight of an aromatic polycarbonate resin, (D) 0–50 parts by weight of a rubber-like polymer, and (E) 0.01–10 parts by weight of an amino resin obtained by modifying with an alcohol an addition reaction product of formaldehyde and at least one compound selected from melamine, guanamine and urea.

The polyphenylene ether (A) is a polymer obtained by oxidation polymerization of a phenol compound represented by the formula (IV):

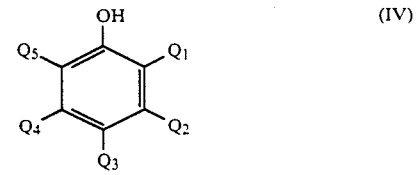

(wherein $Q_1$, $Q_2$, $Q_3$, $Q_4$ and $Q_5$ each represent a hydrogen atom, a halogen atom, a substituted or unsubstituted hydrocarbon residue and one of them is a hydrogen atom) with oxygen or oxygen-containing gas using an oxidation coupling catalyst.

Examples of $Q_1$, $Q_2$, $Q_3$, $Q_4$ and $Q_5$ in the above formula (IV) are hydrogen atom, chlorine atom, fluorine atom, bromine atom, iodine atom, methyl group, ethyl group, propyl group, butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group, and ethylphenyl group.

Examples of the phenol compounds of the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, and 2,3,5-, 2,3,6- or 2,4,6-trimethylphenol.

These phenol compounds may be used singly or in combination of two or more.

Further, the phenol compounds of the above formula may be copolymerized with other phenol compounds, for example, dihydric phenols such as bisphenol A, tetrabromobisphenol A, resorcin, and hydroquinone.

Among them, especially preferred polyphenylene ethers are homopolymers and 2,3,6-trimethylphenol.

Any oxidation coupling catalysts can be used for oxidation polymerization of the phenol compounds as far as they have polymerization ability. Typical examples thereof are cuprous salt/tert. amine such as cuprous chloride/trimethylamine, cuprous acetate/triethylamine and cuprous chloride/pyridine; cupric salt/tert, amine/alkali metal hydroxide such as cupric chloride/pyridine/potassium hydroxide; manganese salt/primary amine such as manganese chloride/ethanolamine and manganese acetate/ethylenediamine; manganese salt/alcoholate or phenolate such as manganese chloride/sodium methylate and manganese chloride/sodium phenolate; manganese salt/alkali hydroxide/amine such as manganese chloride/NaOH/diethanolamine/dibutylamine, manganese chloride/NaOH/triethanolamine/dibutylamine and manganese chloride/NaOH/monoethanolamine/dibutylamine and cobalt salt/tert, amine.

Intrinsic viscosity(measured in chloroform at 30° C.) of polyphenylene ether used in the present invention has no special limitation, but is preferably 0.2–1.0 dl/g, more preferably 0.25–0.6 dl/g. Optimum intrinsic viscosity can be selected depending on circumstance.

Thermoplastic polyester (B) is obtained by polycondensation of a dicarboxylic acid or its functional derivative and a dihydroxy compound or its functional derivative.

As examples of the dicarboxylic acid, mention may be made of aromatic dicarboxylic acids such as terephthalic acid, isophthalic acid and 2,6-naphthalenedicarboxylic acid and these aromatic dicarboxylic acids of which hydrogen atom of the aromatic nucleus is substituted with methyl group, ethyl group, phenyl group or the like, aliphatic dicarboxylic acids having 2–20 carbon atoms such as adipic acid, sebacic acid and dodecanedicarboxylic acid, and alicyclic dicarboxylic acids such as cyclohexanedicarboxylic acid.

The functional derivatives of dicarboxylic acids include acid chlorides of the above-mentioned compounds and esters such as carboxylic acid methyl esters and phenyl esters.

Examples of the dihydroxy compounds are aliphatic diols and alicyclic diols such as ethylene glycol, 1,3-propanediol, 1,4-butanediol, 1,6-hexanediol, 1,10-decanediol, 1,4-cyclohexanediol and cyclohexanedimethanol and dihydric phenols represented by the following formula (V):

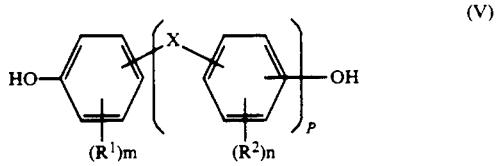

(V)

(wherein X represents a substituted or unsubstituted alkylene group of 1–20 carbon atoms, an alkylidene group of 1–10 carbon atoms, a cycloalkylene group of 4–8 carbon atoms, —O—, —S—, or —SO$_2$—, or the benzene nuclei directly link to each other, R$^1$ and R$^2$ each represent a halogen atom or an alkyl group of 1–12 carbon atoms. m and n each represent 0 or an integer of 1–4 and p represents 0 or 1). Examples of these dihydric phenols are bisphenol A, bis-(4-hydroxyphenyl)-methane, bis-(4-hydroxy-3-methylphenyl)-propane, 2,2-bis-(3',5'-dibromo-4'-hydroxyphenyl)-propane, 1,1-bis(4-hydroxyphenyl)-1-phenyl-ethane, bis(4-hydroxyphenyl)-diphenylmethane, 1,1-bis-(4'-hydroxyphenyl)-cyclohexane, resorcin, hydroquinone, 4,4'-dihydroxydiphenyl, bis-(4-hydroxyphenyl)-sulfone and methyl nuclear-substituted derivatives thereof.

Typical examples of the functional derivatives of dihydroxy compounds are diacetate derivatives.

The above compounds may be used singly or in combination of two or more. Moreover, copolymers of these compounds with p-hydroxybenzoic acid or polyethylene glycol may also be used.

Among these thermoplastic polyesters, preferred are polyethylene terephthalate, polybutylene terephthalate and modified polymers containing these structures such as copolymers with polyethers such as polyethylene glycol and polypropylene glycol.

Intrinsic viscosity of polyethylene terephthalate or polybutylene terephthalate is not critical, but preferably 0.5–2.5 gl/g. Optimum intrinsic viscosity can be chosen depending on circumstances.

Mixing ratio of polyphenylene ether (A) and thermoplastic polyester (B) is such that polyphenylene ether is 5–95% by weight and thermoplastic polyester is 95–5% by weight. If amount of thermoplastic polyester is less than 5% by weight, effect to improve solvent resistance is small, and if it is more than 95% by weight, thermal properties such as heat distortion temperature tend to deteriorate.

Aromatic polycarbonate resin (C) is a well known resin which is commercially available or can be readily prepared by well known processes.

The polycarbonate resin can be properly prepared by interfacial polymerization which comprises inter reaction of at least one dihydric phenol and a carbonic acid ester precursor. Representative examples of the dihydric phenol are all of those which are represented by the above formula (V). Bisphenol A is especially preferred.

The carbonic acid ester precursors can be carbonyl halides, carbonic acid esters or bishaloformates. Carbonyl halides can be carbonyl bromide, carbonyl chloride or mixture thereof. Carbonic acid esters can be diphenyl carbonates, for example, di(halophenyl) carbonates such as di(bromophenyl) carbonate, di(chlorophenyl) carbonate and di(tribromophenyl) carbonate and di(alkylphenyl) carbonates such as di(tolyl) carbonate; di(naphthyl) carbonate; chlorophenylchloronaphthyl carbonate; and phenyltolyl carbonate. Bishaloformates which are usable include bishaloformates of dihydric phenols such as bischloroformates of bisphenol A and hydroquinone and bishaloformates of glycols such as bischloroformates of ethylene glycol, neopentyl glycol and polyethylene glycol. Suitable carbonic acid ester precursor is carbonyl chloride which is known as phosgene.

A suitable process for preparation of the polycarbonate used in the present invention is interfacial polymerization. The interfacial polymerization uses immiscible two different solvents. One of them is an aqueous basic solvent and another is an organic solvent such as methylene chloride which is immiscible with said aqueous solvent. Furthermore, the interfacial polymerization uses a catalyst and a molecular weight controller which regulates chain length or molecular weight of carbonate polymer by chain terminating mechanism. The molecular weight controller is well known in the art and examples thereof are phenol, p-tert-butylphenol and chromane-I.

The catalyst is also well known in the art and examples thereof are tertiary amines such as triethylamine, quaternary ammonium compounds such as tetraethylammonium bromide and quaternary phosphonium compounds such as n-butyltriphenyl phosphonium.

Besides, the term "polycarbonate" includes randomly branched thermoplastic polycarbonates obtained by allowing a branching agent which is a polyfunctional aromatic compound to react with a dihydric phenol and a carbonic acid ester precursor. The above polyfunctional aromatic compound has at least three functional groups which can independently be carboxyl group, hydroxyl group, carboxylic acid anhydride group, haloformyl group. Some non-limitative examples of the aromatic polyfunctional compound include trimellitic acid anhydride, trimellitic acid, trimellityl trichloride, 4-chloroformylphthalic acid anhydride, pyromellitic acid, pyromellitic acid dianhydride, mellitic acid, trimesic acid and benzophenonetetracarboxylic acid.

In addition, the term "polycarbonate" includes various copolycarbonates.

One example thereof is a new type polyester-polycarbonate obtained by the reaction of at least one dihydroxy aromatic compound, phosgene and at least one dicarboxylic acid chloride, especially isophthaloyl chloride, terephthaloyl chloride or a mixture of them.

Typical examples of aromatic polycarbonate resins are polycarbonates prepared using bisphenol A as a main starting material. The aromatic polycarbonate resin may be used singly or as a mixture of two or more.

Proportion of aromatic polycarbonate resin (C) in the composition is 0.5–100 parts by weight, preferably 1–50 parts by weight, more preferably 2–30 parts by weight per 100 parts by weight of the total of polyphenylene ether (A) and thermoplastic polyester (B). Outside this range, the effect aimed at by the present invention tends to be lower.

Amino resin (E) which plays the most important role for improving compatibility between polyphenylene ether and thermoplastic polyester is an alcohol-modified addition reaction product of formaldehyde and at least one compound selected from melamine, guanamine and urea.

In more detail, the amino resin obtained by modifying melamine, guanamine and urea is represented by the following formula (I), (II) or (III).

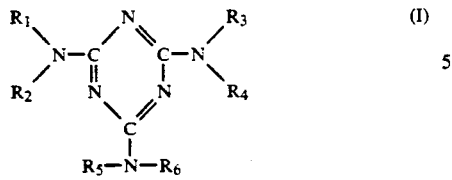

(wherein $R_1$, $R_2$, $R_3$, $R_4$, $R_5$ and $R_6$ each represents a hydrogen atom, an alkyl group, an aryl group or a substituent denoted by the formula (I'): $-(CH_2-O)-R_7$ (wherein $R_7$ represents a hydrogen atom or an alkyl or cycloalkyl group of 1–10 carbon atoms), and at least one of $R_1$–$R_6$ is a substituent denoted by the formula (I')).

Examples of the melamine resin represented by the formula (I) include etherified melamine resins obtained by modifying various methylolmelamines including from monomethylolmelamine to hexamethylolmelamine produced by condensation of (2,4,6-triamino-1,3,5-triazine) and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cycopentanol, n-hexyl alcohol, cyclohexanol, n-octyl alcohol, caprylic alcohol and n-decyl alcohol. Among them, preferred are methoxylated melamine resins and butoxylated melamine resins obtained by modification with lower alcohols such as methyl alcohol and butyl alcohol and mixed etherified melamine resins obtaine by modification with these two alcohols. Especially preferred are hexamethoxymethylmelamine resin and hexabutoxymethylmelamine obtained by modifying with methyl or n-butyl alcohol hexamethylolmelamine which has been prepared by methylolating all the amino groups attached to triazine nucleus of melamine, from the points of compatibility and reactivity with other resins and storage stability.

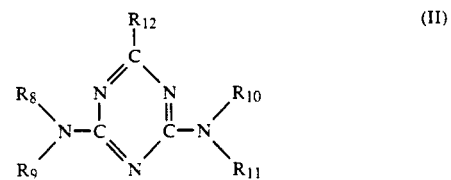

(wherein $R_{12}$ represents a hydrogen atom, an alkyl group, an alkoxy group or an aryl group, $R_8$, $R_9$, $R_{10}$ and $R_{11}$ each represent a hydrogen atom, an alkyl group, an aryl group or a substituent represented by the above-mentioned formula (I'), and at least one of $R_8$–$R_{11}$ is a substituent represented by the formula (I').

Examples of the guanamine resin represented by the formula (II) are etherified guanamine resins which are obtained by modifying various methylolguanamines including from monomethylolguanamine to tetramethylolguanamine produced by condensation of guanamine(6-substituted-2,4-diaminotriazine-1,3,5) and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among guanamines, preferred is benzoguanamine(2,4-diamino-6-phenyltriazine-1,3,5).

Among the above etherified guanamine resins, preferred are methoxylated guanamine resins and butoxylated guanamine resins obtained by modification with lower alcohols such as methyl alcohol and butyl alcohol, and mixed etherified guanamine resins obtained by modification with these two alcohols. Especially preferred are tetramethoxymethylbenzoguanamine resin and tetrabutoxymethylbenzoguanamine resin obtained by modifying with methyl alcohol or n-butyl alcohol tetramethylolbenzoguanamine which has been prepared by methylolating all the amino groups attached to triazine nucleus of benzoguanamine, from the points of compatibility and reactivity with other resins and storage stability.

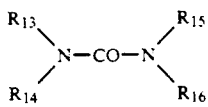

(III)

(wherein $R_{13}$, $R_{14}$, $R_{15}$ and $R_{16}$ each represent a hydrogen atom, an alkyl group, an aryl group or a substituent represented by the above-mentioned formula (I'), and at least one of $R_{13}$–$R_{16}$ is a substituent represented by the formula (I').)

Examples of the urea resins represented by the formula (III) are etherified urea resins which are obtained by modifying various methylolureas including from monomethylolurea to tetramethylolurea produced by condensation of urea and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among them, preferred are methoxylated urea resins and butoxylated urea resins obtained by modification with lower alcohols such as methyl alcohol and butyl alcohol, and mixed etherified urea resins obtained by modification with these two alcohols. Especially preferred are tetramethoxymethylurea resin and tetrabutoxymethylurea resin obtained by modifying with methyl alcohol or n-butyl alcohol tetramethylolurea prepared by methylolating all the amino groups of urea, from the points of compatibility and reactivity with other resins and storage stability.

These amino resins can be produced by various methods. For example, for producing methoxylated melamine resin, the following methods can be employed.

(1) A method which comprises allowing melamine to react with formalin under weak alkaline condition, liberating and drying the resulting methylolmelamine, etherifying the methylolmelamine in an alcohol under acidic condition and distilling off the reaction water together with alcohol.

(2) A method which comprises produing methylolmelamine in the same manner as in (1), partially dehydrating it in a reactor under reduced pressure, then adding an alcohol thereto to carry out reaction under acidic condition and removing the reaction water in the same manner as in (1).

Addition amount of amino resin (E) in the present invention is 0.01–10 parts by weight, preferably 0.1–5 parts by weight per 100 parts by weight of the mixture comprising polyphenylene ether resin (A) and thermoplastic polyester (B). If it is less than 0.01 part by weight, the effect aimed at by the present invention tends to decrease, and if it is more than 10 parts by weight, softening point of the composition tends to decrease.

In order to highly improve impact strength, it is preferred to add a rubber-like polymer (D) as an impact modifier.

The rubber-like polymer (D) used in the present invention means a natural or synthetic polymer which is hydroelastic at room temperature, for example, 20°–25° C.

Examples of the rubber-like polymer (D) are natural rubber; diene rubbers such as polybutadiene, polyisoprene, and polychloroprene; copolymers of diene and vinyl monomer such as styrene-butadiene random copolymer, styrenebutadiene block copolymer, styrene-butadienestyrene block copolymer, styrene-isoprene random copolymer, styrene-isoprene block copolymer, styrene-isoprene-styrene block copolymer, styrene grafted polybutadiene and butadiene-acrylonitrile copolymer; polyisobutylene and copolymers of isobutylene and butadiene or isoprene; ethylenepropylene copolymer and ethylene-propylene-nonconjugated diene copolymer; ethylene-butene-1 copolymer; ethylene-acrylic acid copolymer and alkali metal salts thereof so-called ionomers; ethylene-glycidyl acrylate copolymer; ethylenealkyl acrylate copolymer such as ethyleneethyl acrylate copolymer and ethylene-butyl acrylate copolymer; and thiokol rubber, polysulfide rubber, acrylic rubber, polyurethane rubber, polyether rubber, epichlorohydrin rubber, polyester elastomer and polyamide elastomer.

These rubber-like polymers can be produced by various processes such as emulsion polymerization and solution polymerization and using various catalysts such as peroxides, trialkylaluminum, lithium halides and nickel based catalysts.

Furthermore, there may also be used those which have various crosslinking degrees, various proportions of micro structures such as cis structure, trans structure and vinyl group, or various average rubber particle sizes of rubber in resin composition.

Various copolymers such as random copolymers, block copolymers and graft copolymers may be used as the rubber-like polymers of the present invention.

The rubber-like polymers may be copolymerized with other monomers such as other olefins, diens, aromatic vinyl compounds, acrylic acid, acrylic acid esters, and methacrylic acid esters at preparation of the rubber-like polymers. Methods for the copolymerization may be any methods such as random copolymerization, block copolymerization and graft copolymerization. As examples of the monomers, mention may be made of ethylene, propylene, styrene, chlorostyrene, α-methylstyrene, butadiene, isoprene, chlorobutadiene, butene-1, isobutylene, methyl acrylate, acrylic acid, ethyl acrylate, butyl acrylate, glycidyl acrylate, methyl methacrylate, acrylonitrile, maleic anhydride, and glycidyl methacrylate.

Furthermore, there may also be used various modified rubber-like polymers. They include, for example, hydroxy or carboxy terminal modified polybutadienes, partially or completely hydrogenated styrene-butadiene, styrene-butadienestyrene, styrene-isoprene or styrene-isoprenestyrene block copolymers, rubber-like polymers modified with at least one compound having in its molecule at least one of carboxyl group, amino group, imino group, epoxy group, amide group, vinyl group, isocyanate group and hydroxyl group or with at least one compound selected from acid anhydride, carboxylic acid ester and oxazoline ring, more specifically, ethylenepropylene copolymer, ethylene-propylene-nonconjugated diene copolymer, styrene-butadiene copolymer including A-B or A-B-A' block, random and graft copolymer and hydrogenated copolymer thereof, styrene-isoprene copolymer including A-B or A-B-A' block, random and graft copolymer and hydrogenated copolymer thereof which have been modified with acrylic acid, himic anhydride, glycidyl methacrylate or maleic anhydride. The modification can be performed by known methods such as graft copolymerization and random copolymerization. These rubber-like polymers may be used singly or in combination of two or more.

In addition, diene rubbers and copolymers of diene and a vinyl compound having various micro structures of double bond such as vinyl group, cis-1,4 bond, trans 1,4-bond may also be used as the rubber-like polymer of the present invention.

Preferred rubber-like polymers include copolymers comprising 40-100% by weight of butadiene and 60-0% by weight of styrene, copolymers comprising 35-82% by weight of butadiene and 35-18% by weight of acrylonitrile, styrene-butadiene or styrene-butadiene-styrene block copolymers including all of their linear block copolymers, radial block copolymers, etc. and hydrogenated products thereof, styreneisoprene or styrene-isoprene-styrene block copolymers and hydrogenated products thereof, styrene grafted polybutadiene obtained by adding styrene to polybutadiene or butadiene-styrene copolymer latex and emulsion polymerizing it with radical initiator, ethylene-propylene copolymer and ethylene-propylene-nonconjugated diene copolymer and these polymers modified with maleic anhydride, glycidyl methacrylate or styrene.

The rubber-like polymer (D) is used in an amount of 0-50 parts by weight, preferably 30 parts by weight or less, more preferably 20 parts by weight or less per 100 parts by weight of the composition comprising polyphenylene ether (A) and thermoplastic polyester (B).

In order to further improve compatibility between polyphenylene ether and thermoplastic polyester, the resin composition of the present invention may additionally contain at least one of the following compounds which include polyfunctional compounds, epoxy compounds and organosilane compounds.

The polyfunctional compounds are those which have in their molecule at least one of carboxylic acid group, acid anhydride group, acid amide group, imide group, carboxylic acid ester group, epoxy group, amino group and hydroxyl group. Preferred are compounds (F) which have in their molecule both (a) carbon-carbon double bond or carbon-carbon triple bond and (b) at least one of carboxylic acid group, acid anhydride group, acid amide group, imide group, carboxylic acid ester group, epoxy group, amino group and hydroxyl group.

Examples of the compounds (F) are maleic anhydride, maleic acid, fumaric acid, maleimide, maleic acid hydrazide, reaction products of maleic anhydride and diamine, for example, compounds having the formulas

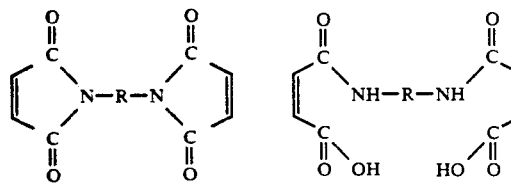

(wherein R is an aliphatic or aromatic group), methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil, and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, ricinoleic acid, eleosteric acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid, and triacontanoic acid; and esters, acid amides and anhydrides of these unsaturated carboxylic acids; unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$ or $C_nH_{2n-9}OH$ (n is a positive integer), 3-butene-1,2-diol, 2,5-dimethyl-3-hexene-2,5-diol, 1,5-hexadiene-3,4-diol, and 2,6-octadiene-4,5-diol; and unsaturated amines such as ones where an OH group of these unsaturated alcohols is replaced by an —NH$_2$ group. Moreover, low polymers such as butadiene and isoprene (e.g., about 500-10,000 in average molecular weight) or high polymers (e.g., at least 10,000 in average molecular weight) to which is added maleic anhydride or a phenol is added or into which is introduced amino group, carboxylic acid group, hydroxyl group, epoxy group or the like.

Other preferable polyfunctional compounds are compounds (G) selected from aliphatic carboxylic acids, acid esters and acid amides represented by the formula (G): $(R^I O)mR(COOR^{II})n (CONR^{III}R^{IV})$ (wherein R represents a straight chain or branched chain saturated aliphatic hydrocarbon residue having 2-20 carbon atoms; $R^I$ each independently represents a hydrogen atom or an alkyl, aryl, acyl or carbonyldioxy group having 1-10 carbon atoms; $R^{II}$ each independently represents a hydrogen atom or an alkyl or aryl group having 1-20 carbon atoms; $R^{III}$ and $R^{IV}$ each independently represent a hydrogen atom or an alkyl or aryl group having 1-10 carbon atoms; m, n and s each represent 0 or an integer of 1 or more and meets $m+n+s \geq 2$) and derivatives thereof.

Examples of the compounds (G) are hydroxyacetic acid, lactic acid, α-hydroxy-n-butyric acid, α-hydroxyisobutyric acid, α-hydroxy-n-valeric acid, α-hydroxyisovaleric acid, 2-hydroxy-2-methylbutanoic acid, α-hydroxy-n caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 1,1-hydroxytetradecanoic acid, jalapinolic acid, 1,4-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethylhydroxymethylmalonic acid, malic acid, α-methylmalic acid, α-hydroxy-α'-methylsuccinic acid, α-hydroxy-α',α'-dimethylsuccinic acid, α-hydroxy-α',α'-diethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, α,β-dihydroxyisobutyric acid, β,β'-dihydroxyisobutyric acid, β,γ-dihydroxybutyric acid, α,γ-dihydroxy-β,β-dimethylbutyric acid, α,β-dihydroxy-α-isopropylbutyric acid, ipurolic acid, ustilic acid-A, 9,10-dihydroxyoctadecanoic acid, tartaric acid (optically active form or racemic form), mesotartaric acid, methyltartaric acid, α,β-dihydroxyglutaric acid, α,γ-dihydroxyglutaric acid, α,γ-dihydroxy-methylglutaric acid, α,γ-dihydroxy-β-methyl-ethylglutaric acid, α,γ-dihydroxy-α,γ-dimethylglutar acid, α,β-dihydroxyadipic acid, β,γ-dihydroxyadipic acid, 6,7-dihydroxydodecanoic diacid, 7,8-dihydroxyhexadecanoic diacid, furoionic acid, trihydroxybutyric acid, trihydroxyisobutyric acid, trihydroxyglutaric acid, succinic acid, glutaric acid, adipic acid, α-methylglutaric acid, and dodecanoic diacid.

Derivatives of the compounds represented by the above formula are lactones, acid anhydrides, alkali metal salts, alkaline earth metal salts, salts with amines and the like. Examples thereof are 8-propiolacton, glycolide, lactide, β-methylpropiolactone, β,β-dimethylpropiolactone, β-n-propylpropiolactone, β-isopropylpropiolactone, β-methyl-β-ethylpropiolactone, γ-butyrolactone, γ-valerolactone, δ-valerolactone, δ-caprolactone, ε-caprolactone, 1,5-hydroxypentadecanoic acid lactone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyrolactone-γ-carboxylic acid, homoisocapric acid, α-(γ-hydroxycarbonylpropyl)-γ-butyrolactone, β-hydroxyadipic acid-γ-lactone, α,δ-dimethyl-β-hydroxyadipic acid-γ-lactone, β-hydroxy-β-methyladipic acid-γ-lactone, α-(δ'-carboxy-n-butyl)-γ-butyrolactone. α-methylisosuccinic acid lactone, cinchonic acid, α-hydroxy-γ-butyrolactone β-hydroxy-γ-butyrolactone, δ-hydroxy-γ-valerolactone, pantolactone, mevalonic acid, malic acid anhydride, tartaric acid anhydride, hydroxyglutaric acid anhydride, α,β,γ-trihydroxyvaleric acid lactone, α-hydroxy-α-hydroxymethyl-γ-butyrolactone, succinic acid anhydride, and glutaric acid anhydride. These may be used singly or in combination of two or more.

Of these compounds especially preferred are tartaric acid, malic acid, succinic acid and derivatives thereof. These include acids in commercially available forms such as anhydrides and hydrates. Examples of useful derivatives are acetyl succinate, monostearyl succinate and/or distearyl succinate. N,N'-diethylsuccinic acid amide, N,N'-dipropylsuccinic acid amide, N-phenylsuccinic acid amide, N-dodecylsuccinic acid amide, N,N'-didodecylsuccinic acid amide and N-dodecylsuccinic acid amide, calcium malate, calcium succinate, potassium malate and potassium succinate.

As other preferable polyfunctional compounds, mention may be made of compounds (H) which have, in the molecule, (a) an acid halide group, most preferably acid chloride group and (b) at least one of carboxylic acid group, carboxylic acid anhydride group, acid ester group and acid amide group, preferably carboxylic acid group or carboxylic acid anhydride group.

As examples of compounds (H), mention may be made of anhydrotrimellitic acid chloride, chloroformylsuccinic acid anhydride, chloroformylsuccinic acid, chloroformylglutaric acid anhydride, chloroformylglutaric acid, chloroacetylsuccinic acid anhydride chloroacetylsuccinic acid, trimellitic acid chloride and chloroacetylglutaric acid. Anhydrotrimellitic acid chloride is especially suitable.

These compounds (F), (G) and (H) are mentioned in detail in U.S. Pat. Nos. 4,315,086 and 4,642,358 which are incorporated by reference herein.

Epoxy compounds used in the present invention as a modifier are epoxy compounds (J) comprising a compound having oxirane group in the molecule and/or a condensation polymer of dihydric phenol and epichlorohydrin.

Examples of epoxy compounds (J) are epoxides of olefins or cycloalkenes such as ethylene oxide, propylene oxide and cyclohexene oxide. Furthermore, condensation product of dihydric phenol and epichlorohydrin at various ratios are included and typical examples thereof are condensates of bisphenol A and epichlorohydrin such as commercially available SUMIEPOXY® ELA-115, ELA-127, ELA-128, ELA-134, ESA-011, ESA 014 ESA-017 and ESA-019 of Sumitomo Chemical Co. Ltd. and phenoxy resins of Union Carbide Corp., condensates of resorcin and epichlorohydrin, condensates of hydroquinone and epichlorohydrin, condensates of tetrabromobisphenol A and epichlorohydrin, and glycidyl etherification products of phenol novolak or cresol novolak such as a product line of SUMIEPOXY® ESCN-220 of Sumitomo Chemical Co., Ltd.

Furthermore, there are included condensates of polyhydric alcohol and epichlorohydrin, and typical examples of the polyhydric alcohols are ethylene glycol, propylene glycol, butylene glycol, polyethylene glycol, polypropylene glycol, glycerine, trimethylolethane, trimethylolpropane and pentaerythritol.

Further examples are glycidyl etherification products of monohydric phenols or monohydric alcohols such as phenylglycidyl ether, butylglycidyl ether and cresylglycidyl ether.

Further, mention may be made of glycidylation products of amine compounds such as commercially available are SUMIEPOXY® ELN-125 of Sumitomo Chemical Co. Ltd. which is a diglycidylation product of aniline.

Furthermore, there may be used polymers of epoxy-containing unsaturated compounds such as glycidyl acrylate, glycidyl methacrylate, and allyl glycidyl ether, and copolymers of epoxy-containing unsaturated compound and at least one of other monomers such as ethylene, propylene, butene, styrene, α-methylstyrene, 4-methyl-pentene, chlorostyrene, bromostyrene, acrylic acid, acrylic acid esters, acrylonitrile, vinyl chloride, methacrylic acid, methacrylic acid esters, maleic anhydride, and vinyl acetate Of these polymers, especially preferred are styrene-glycidyl (meth)acrylate copolymer and ethylene-glycidyl (meth)acrylate copolymer.

Organosilane compounds used in the present invention are organosilane compounds (K) which have in the molecule simultaneously (a) at least one silicon atom which bonds to a carbon atom through an oxygen atom, (b) carbon-carbon double bond or carbon-carbon triple bond, and (c) at least one functional group selected from amino group, mercapto group, carboxylic acid group, acid anhydride group, acid amide group, carboxylic acid ester group, imide group and hydroxyl group.

In these compounds (K), C—O—Si component is usually present as alkoxy group or acetoxy group which directly bonds to silicon atom. Such alkoxy group or acetoxy group generally has less than 15 carbon atoms and may contain a heteroatom such as oxygen. Further, in these compounds, two or more silicon atoms may be present. When two or more silicon atoms are present, these are linked together through an oxygen bond (e.g., siloxane), a silicon-silicon bond, or a bifunctional organic group such as methylene group and phenylene group.

Examples of suitable organosilane compounds (K) are Y-aminopropyltriethoxysilane, 2-(3-cyclohexenyl)ethyltrimethoxysilane, 1,3-divinyltetraethoxysilane, vinyltris(2-methoxyethoxy)silane, 5-bicycloheptenyltriethoxysilane and Y-mercaptopropyltrimehoxysilane.

Amount of compounds (F), (G), (H), (J) and (K) can be varied depending on an object, but is generally 200 parts by weight or less, preferably 80 parts by weight or less, more preferably 20 parts by weight or less, and most preferably 0.01-10 parts by weight per 100 parts by weight of polyphenylene ether.

When these compounds are used, these may be mixed simultaneously with respective components of the resin composition, but it is one preferred embodiment to previously mix them with polyphenylene ether to modify a part or the whole of the polyphenylene ether. If necessary, a radical initiator may be used for modification of polyphenylene ether with these compounds. The radical initiator includes known organic peroxides and diazo compounds such as benzoyl peroxide. dicumyl peroxide, di-tert-butyl peroxide, tert-butylcumyl peroxide, tert-butyl hydroperoxide, cumene hydroperoxide, and azobisisobutyronitrile. Amount of the radical initiator is 0.01-10 parts by weight, preferably 0.1-5 parts by weight per 100 parts by weight of polyphenylene ether.

With reference to the modified polyphenylene ether, it may be a chemical reaction product of the above compound with polyphenylene ether, or the above compound and polyphenylene ether may be combined through physical interaction such as physical adsorption of the compound to polyphenylene ether.

In practice of the present invention, it is also possible to add other polymers and aids to the thermoplastic resin composition of the present invention. These other polymers include, for example, polyolefins such as polyethylene, polypropylene, ethylene-propylene block copolymer, polymethylpentene and ethylene-α-olefin copolymers, e.g., ethylene-butene copolymer, ethylene-4-methyl-pentene copolymer and ethylene-pentene copolymer which have a density of 0.75-0.97 g/cm³; homopolymers or copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer and aromatic vinyl polymers; polysulfones, polyether sulfones and polyphenylene sulfide; polyamides such as 6-nylon, 6,6-nylon and 12-nylon; condensation-polymerized compounds such as polyacetal; and various thermosetting resins such as silicone resin. fluororesin, polyimide, polyamideimide, phenol resin, alkyd resin, unsaturated polyester resin, epoxy resin, and Dapon resin.

Among the above-mentioned other polymers, preferred are polyolefins, polyamides, and (M) aromatic vinyl polymers, copolymers of aromatic vinyl compounds and other monomers and rubber modified aromatic vinyl polymers.

The aromatic vinyl polymers, copolymers of aromatic vinyl compounds with other monomers or rubber modified aromatic vinyl polymers (M) are selected from those which have at least 25% by weight of polymer unit derived from a monomer having the following formula:

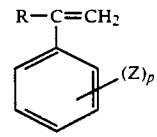

(wherein R represents a hydrogen atom, a lower alkyl group such as an alkyl group of 1-4 carbon atoms or a halogen atom, Z represents a hydrogen atom, a vinyl group, a halogen atom, an amino group, a hydroxyl group or a lower alkyl group, and p represents 0 or an integer of 1-5).

As examples of the aromatic vinyl polymers and copolymers of aromatic vinyl compounds and other monomers, mention may be made of homopolymers such as polystyrene, polychlorostyrene and poly-α-methylstyrene and copolymers thereof, and styrene-containing copolymers such as styrene-acrylonitrile copolymer, styrenemaleic anhydride copolymer, styrene-glycidyl methacrylate copolymer, styrene-acrylic acid copolymer, styrene-N-phenylmaleimide copolymer, styrene-divinylbenzene copolymer, and styreneacrylonitrile-α-methylstyrene copolymer. Among these polymers, preferred are polystyrene, styrene-α-methylstyrene copolymer, styreneacrylonitrile copolymer, styrene-α-chlorostyrene copolymer, styrene-methyl methacrylate copolymer, styrene-glycidyl methacrylate copolymer, styrene-maleic anhydride copolymer and styreneacrylic acid copolymer.

The rubber modified aromatic vinyl polymers are those which comprise an aromatic vinyl polymer or copolymer matrix in which rubber particles are dispersed to form a two-phase system. They can be produced by mechanical mixing of the above-mentioned rubber-like polymer (D) and the aromatic vinyl polymer or copolymer or by dissolving rubber in aromatic vinyl compound monomer, followed by polymerization of the aromatic vinyl compound monomer.

According to the latter method, so-called high-impact polystyrenes such as polybutadiene rubber modified polystyrene, styrene-butadiene rubber modified polystyrene, and ethylenepropylene rubber modified polystyrene are industrially produced.

These polymers may be previously mixed with polyphenylene ether resin, thermoplastic polyester or aromatic polycarbonate resin as component (A) or component (B) or polyphenylene ether may be modified with the compounds as modifier in the presence of these polymers.

Furthermore, it is also possible to simultaneously mix or react the polyphenylene ether (A), thermoplastic polyester (B), aromatic polycarbonate resin (C) and these polymers. Other sequences of mixing may also be employed.

As the aids which can be mixed with the resin composition of the present invention, mention may be made of, for example, reinforcing agents such as glass fiber, carbon fiber, potassium titanate fiber, and high-modulus polyamide fiber, inorganic and organic fillers such as carbon black, silica, $TiO_2$, talc, calcium carbonate, magnesium sulfate, and wollastonite, plasticizers such as triphenyl phosphate and phthalic acid esters, lubricants, stabilizers, flame retardants such as $Sb_2O_3$, halogen compounds and phosphoric acid esters, dyes and pigments.

The method for producing the resin composition of the present invention is not limitative and any known methods can be used.

A method in which the components are mixed in the form of solutions and solvents are evaporated or in which said mixture is precipitated in a non-solvent, is effective. However, from industrial viewpoint, a method of kneading them in molten state is employed in practice. The melt kneading is carried out using such a kneading machine as generally used single-screw or twin-screw extruders and various kneaders. A twin-screw high-performance kneader is especially preferred.

Before kneading, it is preferred to uniformly blend respective resin components in the form of powder or pellet by using such a mixer as a tumbler or a Henschel mixer. However, each resin may be separately fed directly to a kneading apparatus through a metering device without the blending.

The kneaded resin composition can be molded by injection, extrusion or various other molding processes. The present invention further includes a method in which molded articles are obtained by dry-blending the components at the beginning of injection molding or extrusion molding and then directly kneading the components during its operation of melt processing, without the previous kneading.

There is no special limitation in sequence of kneading of the components. Respective components may be kneaded at the same time or polyphenylene ether (A) and amino resin (E) may be previously kneaded to obtain a composition and then rubber-like polymer (D), aromatic polycarbonate resin (C) and thermoplastic polyester (B) may be kneaded with the composition, that is, respective components in molten state can be kneaded at two or more steps. Further, using a kneading machine having one or more introduction openings, components (A), (D) and (E) may be introduced from the introduction opening of upperstream side and component (B) and (C) may be introduced from opening of downstream side. Other sequences of kneading may also be employed.

The following examples are merely illustrative of the present invention and the present invention is not restricted to these examples. In the examples, diflection temperature under load (H.D.T.) and Izod impact strength (thickness: 3.2 mm) were measured according to JIS K7207 and JIS K7110, respectively, and part(s) means part(s) by weight unless otherwise indicated.

REFERENCE EXAMPLE

Preparation of amino resin (E))

E-1: A mixture of 28.3 parts of urea, 100 parts of 37% neutral formalin and 60 parts of n-butanol was heated from 25° C. to 94°-96° C. in 15-25 minutes and kept at this temperature for 10-15 minutes and 0.07 part of formic acid was added thereto. Then, the mixture was refluxed for 30-60 minutes under atmospheric pressure. The reaction system was cooled to 70°-75° C. while the pressure was reduced so that the reaction system was kept boiling and water was removed by azeotropy with butanol under a reduced pressure of 200-400 mmHg. Thereafter, temprature was gradually raised to 100°-105° C. to obtain butylated urea (E-1). Analysis showed that the number of butanol bonded was about 2 mol per 1 mol of urea.

E-2: A mixture of 378 parts of melamine and 810 parts of 37% formalin was adjusted to pH 7-8 with sodium hydroxide. The mixture was heated to about 70° C. and when it became transparent, 1800 parts of methyl alcohol and 1.9 parts of oxalic acid were added thereto. Then, the mixture was boiled for several minutes. The reaction mixture was cooled, then filtrated and concentrated under reduced pressure to obtain methylated melamine resin (E-2). Analysis showed that the number of methanol bonded was about 3 mol per 1 mol of melamine.

E-3: In the same manner as in E-2, methylated melamine resin (E-3) was prepared from 378 parts of melamine, 1700 parts of 37% formalin and 3600 parts of methanol. Analysis showed that the number of methanol bonded was about 6 mol per 1 mol of melamine.

E-4: A mixture of 187 parts of benzoguanamine and 268 parts of 37% formalin were adjusted to pH 7-8 with sodium hydroxide. The mixture was heated to about 70° C. and when it became transparent, 600 parts of methyl alcohol and 0.6 part of oxalic acid were added thereto. Then, the mixture was boiled for several minutes. The reaction mixture was cooled, filtrated and concentrated under reduced pressure to obtain methylated benzoguanamine resin (E-4). Analysis showed that the number of methanol bonded was about 3 mol per 1 mol of benzoguanamine.

EXAMPLE 1

40 parts by weight of poly-2,6-dimethyl-1,4-phenylene ether (A) (intrinsic viscosity measured in chloroform: 0.45 dl/g), 60 parts by weight of polybutylene terephthalate (B) (PBT resin N-1200 manufactured by Mitsubishi Rayon Co., Ltd.), 10 parts by weight of aromatic polycarbonate (C) (UPIRON S-2000 manufactured by Mitsubishi Gas Chemical Co., Ltd.) and 2.0 parts by weight of amino resin (E-3) were mixed by Henschel mixer. The mixture was melt kneaded at 250°-300° C. by a twin-screw extruder to obtain a resin composition as pellets. These pellets were vacuum dried at 130° C. for 3-4 hours and injection molded into a test piece.

The test piece was cut by a microtome and then etched with carbon tetrachloride and dispersed particle size of polyphenylene ether phase was observed by a scanning electron microscope. It was observed that the polyphenylene ether phase was dispersed in fine particles of less than about 1 μ. It was also seen that when the molded product was immersed in chloroform at room temperature for 30 minutes, the molded product showed no change.

COMPARATIVE EXAMPLE 1

Example 1 was repeated except that amino resin (E-3) was not used.

State of dispersion of polyphenylene ether phase and polybutylene terephthalate phase was bad and aggregates of polyphenylene ether phase of about 10 μ or more were seen.

When the molded product was immersed in chloroform, it was swollen and a part of the resin was dissolved out.

COMPARATIVE EXAMPLE 2

Example 1 was repeated except that aromatic polycarbonate (C) and amino resin (E-3) were not used. State of dispersion of polyphenylene ether phase and polybutylene terephthalate phase was inferior to that in Comparative Example 1 and aggregates of polyphenylene ether phase of more than about 20 μ were observed.

When the molded product was immersed in chloroform, it was swollen and a part of resin was dissolved out as in Comparative Example 1.

As is clear from comparison of Example 1 with Comparative Examples 1 and 2, the composition of the present invention was excellent in solvent resistance and was markedly improved in compatibility between polyphenylene ether and thermoplastic polyester.

EXAMPLES 2-9

Poly-(2,6-dimethyl-1,4-phenylene ether) (intrinsic viscosity measured in chloroform: 0.45 dl/g), thermoplastic polyester, aromatic polycarbonate, and rubber-like polymer as mentioned in Table 1 and amino resin E-1, E-2, E-3 or E-4 mentioned in Reference Example were melt kneaded at ratio as shown in Table 1 at 250°-300° C. by a twin-screw extruder to obtain a resin composition as pellets. The pellets were injection molded into a test piece and properties of this test piece were measured. The results are shown in Table 1.

COMPARATIVE EXAMPLES 3 AND 4

Example 2 was repeated except that aromatic polycarbonate (C) was not used. The results are shown in Table 1.

TABLE 1

| | Amount of polyphenylene ether (A) (part by weight) | Thermoplastic polyester (B) *1 | | Aromatic polycarbonate (C) (part by weight) | Amino resin (E) | | Rubber-like polymer (D) *2 | | Izod impact strength (23° C., with notch) kg · cm/cm | H.D.T. (4.6 kg/cm²) °C. |
|---|---|---|---|---|---|---|---|---|---|---|
| | | Kind | Amount (part by weight) | | Kind | Amount (part by weight) | Kind | Amount (part by weight) | | |
| Example 2 | 65 | PET | 35 | 15 | E-1 | 1.0 | M-SEBS | 10 | 48 | 165 |
| Example 3 | 35 | PET | 65 | 10 | E-1 | 3.0 | SEBS | 15 | 53 | 143 |
| Example 4 | 60 | PET | 40 | 20 | E-2 | 1.5 | EMGMA | 15 | 60 | 145 |
| Example 5 | 40 | PET | 60 | 10 | E-3 | 2.0 | SEP | 20 | 74 | 138 |
| Example 6 | 70 | PET | 30 | 10 | E-3 | 3.0 | SBS | 10 | 45 | 172 |
| Example 7 | 30 | PET | 70 | 15 | E-4 | 2.0 | GMA-EPR | 15 | 55 | 140 |
| Example 8 | 40 | PBT | 60 | 10 | E-3 | 1.5 | St-EPR | 15 | 62 | 153 |
| Example 9 | 60 | PBT | 40 | 20 | E-2 | 2.0 | MEP | 10 | 43 | 158 |
| Comparative Example 3 | 70 | PET | 30 | | E-3 | 3.0 | SBS | 10 | 21 | 173 |
| Comparative Example 4 | 40 | PBT | 60 | | E-3 | 1.5 | St-EPR | 15 | 27 | 154 |

Note *1
PBT: Polybutylene terephthalate having an intrinsic viscosity of 1.25 dl/g.
PET: Polyethylene terephthalate having an intrinsic viscosity of 1.00 dl/g.
Note *2
M-SEBS: Hydrogenated styrene-butadiene-styrene block copolymer modified with maleic anhydride (KRATON ® FG-1901X of Shell Chemical Co.)
SEBS: Hydrogenated styrene-butadiene-styrene block copolymer (KRATON ® G-1650 of Shell Chemical Co.)
EMGMA: Ethylene-methacrylate-glycidyl methacrylate copolymer (ethylene/methacrylate/glycidyl methacrylate = 56.5/42/1.5 wt %)
SEP: Hydrogenated styrene-isoprene block copolymer (KRATON ® G-1701X of Shell Chemical Co.)
SBS: Styrene-butadiene-styrene block copolymer (KALIFLUX ® TR-1101 of Shell Chemical Co.)
GMA-EPR: Glycidyl methacrylate modified ethylene-propylene copolymer (EPR: ESPRENE ® E-120P of Sumitomo Chemical Co., Ltd.; glycidyl methacrylate grafting degree: 0.7 wt %)
St-EPR: Styrene modified (grafted) ethylene-propylene copolymer (EPR: ESPRENE ® E-120P of Sumitomo Chemical Co., Ltd.; styrene/ethylene-propylene = 40/100 wt %)
MEP: Maleic anhydride modified ethylene-propylene copolymer (EP: ESPRENE ® E-120P of Sumitomo Chemical Co., Ltd.; maleic anhydride grafting degree: 1.4 wt %)

As explained above, the present invention provides a composition in which compatibilization stability between thermoplastic polyester and polyphenylene ether is improved and which is excellent in processability, solvent resistance and impact strength. This composition has a wide variety of uses.

The novel composition provided by the present invention can be easily processed into shaped articles, sheets, films and so on by processing methods used for thermoplastic resins such as injection molding and extrusion molding to provide articles superior in impact resistance, solvent resistance, heat resistance and processability.

The novel composition is especially effective for injection molding.

We claim:

1. A thermoplastic resin composition which comprises:
   100 parts by weight of a composition comprising (A) 5-95% by weight of a polyphenylene ether and (B) 95-5% by weight of a thermoplastic polyester,
   (C) 0.5-100 parts by weight of an aromatic polycarbonate resin, and
   (E) 0.01-10 parts by weight of an amino resin obtained by modifying with an alcohol an addition reaction product of formaldehyde and at least one compound selected from the group consisting of melamine, guanamine and urea.

2. A thermoplastic resin composition according to claim 1, which additionally contains (D) 50 parts by weight or less of a rubber-like polymer which is elastic at room temperature.

3. A thermoplastic resin composition according to claim 1, wherein the amino resin (E) is represented by the following formula (I), (II) or (III):

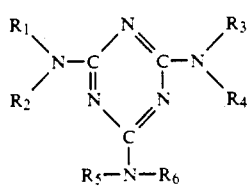

wherein $R_1$, $R_2$, $R_3$, $R_4$, $R_5$ and $R_6$ each represent a hydrogen atom, an alkyl group, an aryl group or a substituent denoted by the formula (I'): $-CH_2-O-R_7$ wherein $R_7$ represents a hydrogen atom or an alkyl or cycloalkyl group of 1-10 carbon atoms, and at least one of $R_1$-$R_6$ is a substituent denoted by the formula (I');

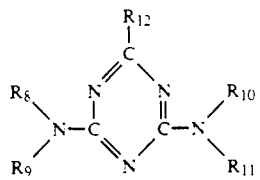

wherein $R_{12}$ represents a hydrogen atom, an alkyl group, an alkoxy group or an aryl group, $R_8$, $R_9$, $R_{10}$ and $R_{11}$ each represent a hydrogen atom, an alkyl group, an aryl group or a substituent represented by the above-mentioned formula (I'), and at least one of $R_8$-$R_{11}$ is a substituent represented by the formula (I');

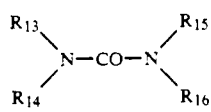

wherein $R_{13}$, $R_{14}$, $R_{15}$ and $R_{16}$ each represent a hydrogen atom, an alkyl group, an aryl group or a substituent represented by the above-mentioned formula (I'), and at least one of $R_{13}$-$R_{16}$ is a substituent represented by the formula (I').

4. A thermoplastic resin composition according to claim 1, wherein the thermoplastic polyester (B) is a polycondensate of a dicarboxylic acid or its functional derivative and a dihydroxy compound or its functional derivative.

5. A thermoplastic resin composition according to claim 2, wherein the rubber-like polymer (D) is a natural or synthetic polymer which is elastic at room temperature.

* * * * *